United States Patent Office 2,909,462
Patented Oct. 20, 1959

2,909,462
ACRYLIC ACID POLYMER LAXATIVE COMPOSITIONS

Robert B. Warfield, Irvington, and Louis F. Stumpf, Westfield, N.J., assignors to Bristol-Myers Company, New York, N.Y., a corporation of Delaware No Drawing. Application December 8, 1955
Serial No. 551,736

4 Claims. (Cl. 167—56)

The present application is a continuation-in-part of my copending applications, Serial No. 459,543, filed September 30, 1954, and Serial No. 329,441, filed January 2, 1953, both now abandoned.

The present invention relates to novel pharmaceutical bulk laxative compositions, and in its more specific phases to laxative compositions comprising an active principle dispersed in an inert diluent in such a concentration as to provide a suitable pharmaceutical dosage form. The invention also relates to a process for the treatment of constipation.

It is an object of the present invention to provide novel bulk laxative compositions which may be dispensed in a pharmaceutical form that makes possible substantially accurate dosage measurements.

It is another object of the invention to provide novel bulk laxative compositions which may be administered in a convenient, inert, non-gelled form which shall not take effect until they have passed the stomach and which, upon entering the duodenum, become extremely viscous, form a gel, and function efficiently as a bulk laxative.

It is a further object of the invention to provide novel bulk laxative compositions which are not subject to the objectional features of previously known bulk laxatives, which have remarkable thickening properties at a desired pH range, and which may be made available in several pharmaceutical dosage forms.

It is also an object of the invention to provide a process which is safe and effective for the correction of constipation.

Laxatives have been available to the public for many years. Present day laxatives are considered to fall into four classes, according to their mode of action. In the first class are the so-called irritants. These preparations, of which cascara sagrada, castor oil, croton oil and phenolphthalein are the most common, effect laxative action by irritating the intestinal walls to increase muscular contraction which consequently results in more rapid elimination. The objectionable properties of these preparations are well known and have led to criticism by the medical profession of their use. The irritation caused by these preparations leads to soreness and inflammation of the delicate intestinal tissues which may on continued usage result in ulceration of the intestinal lining.

The second class is the so-called "saline" laxatives. These materials attract water into the intestinal passages and thus provide increased volume.

In the third class of laxatives are the emollients, of which the most well known are liquid petroleum (mineral oil) and certain vegetable oils. These laxatives act through their lubricating and dehydration-retarding action. They are perhaps the least effective of all classes of laxatives and they prevent the absorption of oil-soluble materials, such as the oil-soluble vitamins (vitamins A, D, E and K), through the intestinal wall.

The fourth class is the bulk laxatives. These materials act through increasing the bulk of the contents of the intestinal tract and thus provide increased mechanical bulk upon which peristaltic action may operate. Examples of these materials which are well known are agar-agar, bran, carboxymethylcellulose (and particularly its sodium salt), methyl cellulose and certain of the vegetable gums. In general, these materials provide bulk by swelling when brought in contact with water.

The bulk laxatives of the prior art generally suffer from objection because of an uncontrollable swelling action, for they swell almost immediately upon being brought into contact with aqueous fluids and upon reaching the fluids in the stomach, unless such action is prevented by the incorporation of glycerine or sorbitol as an additive in the laxative. This swelling in the stomach either causes discomfort to the user through a delay in elimination from the stomach chamber and a resulting distention of the stomach walls, or the bulk increase forces food from the stomach before it has had an opportunity to be properly digested. The lower end of the stomach is constricted by the pyloric sphincter. This sphincter retards the discharge of partially digested food from the stomach into the intestines and when the bulk of the material in the stomach is increased, the retarding effect of the pyloric muscles is to a certain extent overcome. In extreme cases the swelling of the laxative composition has been known to block the pyloric passage.

The advantages of the bulk laxative compositions of the present invention over those of the prior art may be illustrated by comparison with carboxymethylcellulose. The viscosities of a 1% aqueous sol of one grade of carboxymethylcellulose are substantially the same at a pH of 3.0 and at 6.6. At both pH's the solution is a lightly thickened liquid preparation. On the other hand, a 1% aqueous sol produced according to the present invention is a fluid at a pH of 3.0 or lower, as is usually found in the stomach, but upon adjusting the pH to about 6.6, or that which may be found in the intestine, it becomes a gel. This gelation provides satisfactory bulk in a unique manner resulting merely from pH changes.

The laxative compositions of the present invention are not subject to the defects of the prior art such as have been described above. In fact, the compositions of the invention appear to be substantially free from objection. They gel to form bulk in the intestine, but remain fluid in the stomach. The gel is of a soft consistency and lubricates the intestine. Perhaps the most important property of the compositions is the remarkable change from a liquid to a soft gel with changes of pH normally found in going from the stomach to the duodenum. Solutions at the pH of the resting stomach are highly fluid but upon increasing the pH to that of the intestinal tract the viscosity increases greatly. Because of this increase in viscosity smaller doses may be suitably used to produce results. This desirable result is obtained without the use of a sugar or polyol additive, such as sorbitol and glycerol, to retard gelling in the stomach. This is a distinct advantage as these additives are gastro-intestinal irritants. While the new compositions are lubricants to the intestine, they do not prevent absorption of the oil-soluble vitamins and oil-soluble foods through the intestinal walls.

One significant feature of the compositions of the present invention is their ability to form bulk in the intestine alone without the undesirable concomitant property of absorbing water from surrounding tissues. This latter property is bound to result in irritation to the delicate tissues of the intestines and its avoidance is to be desired.

The laxative compositions of the present invention are bland and cause no irritation. No systemic toxicity has been detected with these compositions. They are not degraded by moderate amounts of acid or alkali. They are stable to heat below 150° C. and will withstand autoclaving. The compositions do not have a sweet taste which will be sickening to those who must take a laxative regularly. The compositions appear to be non-habit forming.

An essential feature of the present invention is the provision for a bulk laxative composition for oral administration comprising an active substance which is substantially limpid and fluid in the stomach and which forms a viscous gel after passing into the duodenum. The active substance is also non-toxic, non-irritating and is a polymeric material which forms a colloidal sol in water.

One form of the laxative compositions of the present invention contains as the active principle a colloidally water-soluble polymer of acrylic acid crosslinked with a polyhydroxy compound having at least 3 and preferably not more than about 8 hydroxyl groups, wherein the hydrogen atoms of at least three hydroxyl groups are replaced with unsaturated aliphatic radicals having at least 2 carbon atoms. Preferred radicals are those containing 2 to 4 carbon atoms, e.g., vinyl, allyl, crotyl, or other ethylenically unsaturated group. These unsaturated radicals may themselves contain other substituents, such as the methyl group. For example, compounds containing the methallyl radical is useful.

The crosslinker shall desirably comprise about 0.75% to 2.0%, and preferably about 0.75% to 1.5%, by weight, of the polymer of acrylic acid. Best results are obtained with about 1.0% by weight of these polyhydroxy crosslinking materials.

The polyhydroxy compounds useful as crosslinking materials and as contemplated by the present invention preferably contain 3 or more hydroxyl groups and may include the saccharides, for example, monosaccharides, such as glucose, fructose, mannose or galactose, and disaccharides, such as sucrose, maltose or lactose. Other useful polyhydroxy compounds include the polyhydroxy alcohols, such as glycerol, erythritol, dulcitol, mannitol, sorbitol and pentaerythritol. The unsaturated crosslinkers described above are all ethers but I also contemplate the use, as crosslinking materials, of unsaturated esters of the polyhydroxy compounds, such as the triacrylic acid ester of glycerol or acrylic acid esters of sucrose having from 3 to 8 acid residues. Unsaturated ether esters may also be used, but as in the case of unsaturated esters are not preferred because of their tendency to hydrolyze in aqueous solutions. These crosslinking materials are chemicals with which the chemist is familiar.

The preferred crosslinking compounds are polyallyl sucrose or polyallyl pentaerythritol. The polyallyl sucrose and polyallyl pentaerythritol contemplated for use as the crosslinking agent shall desirably contain an average of at least 3 allyl groups for each molecule of sucrose or pentaerythritol. The allyl groups are substituted on the sucrose and pentaerythritol by means of ether linkages; in the case of sucrose a theoretical maximum of 8 allyl groups is possible. For best results the polyallyl sucrose shall contain an average of 5 to 6 allyl ether groups per molecule of sucrose and the polyallyl pentaerythritol shall preferably contain 4 allyl ether groups for each molecule of pentaerythritol (tetraallyl pentaerythritol), which is the maximum theoretically possible for pentaerythritol.

The formation of the crosslinked polymers of acrylic acid is accomplished by polymerizing acrylic acid, or a similar monomeric resin-forming material, with one of the aforementioned crosslinking agents in an inert solvent, preferably in the presence of a polymerization catalyst, under autogenous pressure and in an inert atmosphere to inhibit oxidation. The reaction is carried out in the presence of an inert diluent which will not copolymerize with the reactants and which will not cause swelling of the polymerized product. Such diluents shall preferably act as a solvent for the monomeric reactants but not the polymeric reaction product. These diluents include water, a liquid aromatic or aliphatic hydrocarbon, such as benzene, toluene, n-hexane or pentane; or an alcohol, such as ethanol, etc. The liquid hydrocarbons, such as benzene and toluene, are preferred. Preferably the diluent should be employed in a quantity sufficient to dissolve the reactants, but dissolution is not essential as the polymerization may be conducted in an aqueous emulsion medium in accordance with standard polymerization practices, although this is not preferred. The polymerization catalyst may be one of the well-known class of free radical catalysts, such as the organic and inorganic peroxides, such as benzoyl peroxide, caproyl peroxide and sodium or hydrogen peroxides. The catalyst is normally employed in a concentration of about 0.1% to about 1.0%, although it may be as high as 2%, of the weight of the acrylic acid employed.

The polymerization of the acrylic acid and crosslinking agent is preferably carried out with simple agitation in a sealed vessel provided with simple wall-cooling at autogenous pressures. The reaction is an exothermic one and during the polymerization the temperature is desirably maintained between 20° and 70° C., preferably about 50° C. The reaction temperature is not critical, but if held much below 50° C. the rate of polymerization may be quite slow, whereas if the temperature is permitted to go much above 50° C., the exothermic reaction may proceed too rapidly. The polymerization is permitted to proceed as far toward completion as possible, the time required varying greatly with the reactants and other factors. If the polymerization is carried out in the presence of an inert diluent as described above, the progress of the reaction may be followed by periodically sampling the liquid phase and analyzing it for the presence of free monomer. In such case, the reaction is determined to be complete when the percentage of monomer reaches a minimum concentration. In practice substantially all of the monomeric material is converted to the polymeric form.

When the polymerization has been completed, the reaction diluent or solvent and the unused catalyst are removed by distillation or filtration. The distillation may be conducted under vacuum. The resulting crosslinked polymer of acrylic acid is a white powder which is somewhat hygroscopic. The polymer is of a rather high molecular weight. While the molecules of the polymer will possess graded molecular weights, the minimum molecular weight of the molecules is desirably in excess of 200,000, and preferably in excess of 300,000. The maximum molecular weight may vary over a considerable range, although as a practical matter the average molecular weight should not be so high that when the crosslinked polymer forms a viscous gel at the alkaline pH of the duodenum rigid particles result which may injure the delicate membranes of the intestines.

The minimum degree of polymerization of the cross linked polymer of acrylic acid which is suitable for employment in the compositions of the invention may be determined by ascertaining the viscosity of an aqueous solution of the cross-linked polymer. This viscosity is determined by weighing 2.5 grams of the dry crosslinked polymer accurately to within ±0.005 gram. The weighed polymer is slowly sifted and dissolved into 500 ml. of distilled water in a Waring Blendor to provide a 0.5% solution. During the addition of the polymer, the blendor is operated at low speed. After adding all of the polymer, the blendor is operated at its maximum speed for 3 minutes. The resultant solution is transferred to a 1-liter beaker and permitted to stand until all foam has broken. Sufficient concentrated ammonium hydroxide is added to the solution to bring the pH to 6.5–7.0. This normally requires about 2.5 ml. of concentrated ammonium hydroxide. The solution of the polymer is then stirred with a large stirrer at 250 r.p.m. for 30 seconds to thoroughly mix the ammonium hydroxide. The beaker containing the gel which forms is permitted to stand for 1 hour at 25° C. in a constant temperature bath, after which the gel is tested on a Brookfield viscometer, model LVF, employing a No. 4 spindle at 60 r.p.m. Under the conditions of this method the crosslinked polymer should have a minimum specific viscosity of 60 poises.

One particularly suitable colloidally water-soluble polymer of acrylic acid for use in the invention is that which is made by the B. F. Goodrich Chemical Company and which is designated by the trademark "Carbopol–934" (formerly known as "Good-rite K–934"). This product is a colloidally water-soluble polymer of acrylic acid crosslinked with approximately 1% of polyallyl sucrose. This crosslinked polymer is produced by polymerizing acrylic acid monomer with about 1% of its weight of polyallyl sucrose having an average of about 5.8 allyl groups attached through ether linkages to each molecule of sucrose. The polymerization of the acrylic acid monomer is conducted in the presence of toluene diluent and 1% of benzoyl peroxide catalyst in a sealed reaction vessel in accordance with the process described above. After the polymerization has been completed, the toluene is removed by filtration, and the crosslinked polymer which is a white powder having a maximum particle size of 10 mesh and a bulk density of about 12 pounds per cubic foot, is then obtained. The exact molecular weight is unknown, but analysis shows that the product has an equivalent weight (molecular weight for each repeating unit) of about 77. The minimum molecular weight, as roughly determined from viscosity measurements, is about 200,000.

The viscosity of the polymer produced in accordance with the preceding paragraph is determined by the aforementioned procedure. If the specific viscosity is found to be in excess of 60 poises, it is satisfactory for employment in the compositions of this invention. When this viscosity test was repeated on eleven different batches of polymer, the average viscosity was found to be 71±7 poises. This crosslinked polymer is a dry white powder which disperses in water to give in a 1% aqueous suspension a colloidal sol having a pH of about 3.0 or lower. The powder is slightly hygroscopic. At a pH of above 4.5 the polymer, while still colloidally soluble, forms a hydrophilic gel of high viscosity. From experiments conducted so far, it appears that maximum gelling of a 1% sol takes place at a pH of approximately 6.0. At this pH the gel is so viscous that in going from the minimum viscosity to a pH of 3.0 or lower to the maximum viscosity at a pH of about 6.0, the viscosity value increases so dramatically that the viscosity cannot accurately be determined, although it is believed to be more than a thousandfold increase. This high viscosity in solutions having a pH of 6, or slightly above, permits efficient laxative action with the employment of relatively small amounts of material.

One batch of desirable crosslinked acrylic acid polymer, containing 1% of polyallyl sucrose crosslinker, contemplated for use in the invention was found, when dispersed to the extent of a 1% aqueous sol at 75° F., to give a pH of 3.0 and a viscosity of 24.0 centipoises. When the pH of this colloidal solution was adjusted to about 3.6 with dilute alkali, the viscosity increased to 264.0 centipoises. When the pH was further increased to about 4.3, the viscosity increased to about 6,500 centipoises. On increasing the pH to about 6.0, where maximum gelation is believed to occur, the resulting gel becomes firm and is so viscous that viscosity is almost impossible to measure. This colloidal gel has the desirable "bulk" properties for laxative purposes. When the pH of the colloidal gel or sol is lowered, or increased to a highly alkaline value in excess of 9 or 10, the viscosity is observed to decrease. When the pH is reduced below 3.0 the viscosity is not materially lowered below the rather low value of 24 centipoises observed at this pH. The viscosity data reported were obtained by means of a Brookfield viscosimeter.

One form of the crosslinked acrylic acid polymer containing 1% of polyallyl sucrose crosslinker desirable for employment in the invention is a white dry powder, which does not have a melting point. Instead of melting, it changes color at about 190° C. and becomes quite dark at about 260° C. Within a relatively wide range of temperature, the material is stable so that it will withstand autoclaving, and it is not degraded by moderate amounts of acid or alkali. It has a specific gravity of 1.40 to 25° C. and a refractive index of 1.52 at the same temperature when compared to the "D" line of sodium. The material is substantially non-toxic, odorless, colorless, and it might be said to have a slightly sour taste. It is bland, causes no irritation and appears to be non-habit forming. When the polymer is dispersed in water to the extent of a 1% sol, it is found to produce a solution having a pH of approximately 3.0.

The crosslinked acrylic acid polymers desirable for use in the compositions of the invention are considered to be colloidally water-soluble, or "sol-forming," and are herein described as such. Although their aqueous sols may contain no suspended matter which settles upon standing, they are not true solutions in the crystalloidal sense and might be more accurately described as colloidal suspensions or solutions. Although none of the material will settle out upon standing, if subjected to ultra-centrifuging, most of this material, being colloidal in nature, may be separated from its colloidal solution or suspension. These aqueous sols give the characteristic "Tyndall effect" of aqueous colloidal dispersions.

Because of its lower viscosity when dissolved in water, it is preferred to use the colloidally water-soluble crosslinked polymer of acrylic acid in its acid form, rather than as an alkali-, alkaline-earth or other metal salt, which may be prepared from the polymer. The acid form has advantages also for people requiring regular use of laxatives who are also on a sodium-free regimen. Thus the compositions of the invention make possible a preparation which introduces no sodium to the body. When a composition containing the colloidally water-soluble polymer of acrylic acid crosslinked with 1% of polyallyl sucrose, such as is described hereinabove, is administered orally to the user, it passes almost immediately to the stomach, which normally has a pH of about 1.7 to 2, at least when comparatively empty. At such a pH (or in fact any pH below 3.0) the polymer imparts little viscosity to the stomach content, as little gelling occurs at this pH. For this reason it is preferred that the pH of the compositions be as close as convenient to this figure. In aqueous sols at this pH the viscosity is only slightly higher than that of water. Upon passing the pylorus of the stomach and entering the duodenum, the increased pH results in a dramatic gelling phenomenon with a manifold increase in viscosity. This increase in viscosity provides bulk to the intestinal tract and increases the mechanical bulk upon which the peristaltic action of the intestinal muscles may operate. At the same time that the aforementioned colloidally water-soluble polymer of acrylic acid gels, it acts to retain liquid in the intestinal tract. Indeed, a 1% gel of the polymer at pH 7.0 retained its water content in the face of centrifugation at a force equal to 20,000 times that of gravity. This function materially aids in increasing the bulk in the intestines. Due to the desirable lack of toxic properties, the gel passes from the intestinal tract and is eliminated without further incident.

When the stomach is full of food the pH of the stomach fluids may increase to as high as 4.5 or even 5.0. Therefore, the bulk laxative compositions of the invention are preferably administered at a time when the user has a relatively empty stomach.

The present invention contemplates a composition of an inert diluent having dispersed therein a colloidally water-soluble crosslinked polymer of acrylic acid. Among the compositions contemplated are liquid sols or aqueous colloidal suspensions, granulations and tablet compositions.

The diluent used in the new compositions is preferably one which is inert in the sense that it does not produce an untoward effect upon the user or the active ingredient. For example, while small amounts of acid or alkali may be used to adjust the pH of its solids, it is not contemplated that the diluent shall have a hydrolytic, decomposing or untoward effect upon the active ingredient.

In preparing the bulk laxative compositions of the invention, it is frequently desirable to incorporate one or more of the so-called "salting out" agents. The salting out agents may be any salts with which the chemist is well acquainted for this purpose. These agents aid in suppressing gelling properties of an aqueous sol of a colloidal, crosslinked polymer of acrylic acid. Thus one may add an alkali-metal chloride, an alkali-metal citrate, various alkali phosphate salts, or the water-soluble salts of hydrochloric, hydrobromic, phosphoric, citric and sulfuric acids, etc. For patients who are on a so-called "salt free diet," ammonium and potassium salts may be used rather than those of sodium. By using these salting out agents, the gelling of the crosslinked polymer of acrylic acid is further retarded until it passes the stomach and enters the duodenum. It may also be advantageous to use as salting out agents those salts which either alone or in combination with other salts possess buffering properties. Thus by the use of these salts it is possible to aid in maintaining the pH at the optimum value to prevent premature gelling.

It has been discovered that a desirable daily dosage of crosslinked polymer of acrylic acid is an amount of approximately 1 to 5 grams; in many cases 1 to 2 grams is sufficient. It is advantageous to provide compositions which may easily be measured so as to provide a unitary dosage form of the laxative composition. It is convenient to supply the desired daily dosage by means of 2 equal doses taken during the day.

One desirable form of bulk laxative composition according to the present invention comprises an aqueous sol or dispersion of a crosslinked acrylic acid polymer. This composition may desirably be in the form of a 5% aqueous sol, which has a pH of about 3.0, and may additionally contain salting out agents which aid in buffering the pH to that of a 1% sol of crosslinked polymer of acrylic acid which is about 3.0 to 3.5, preferably to a pH of about 3.3. Coloring and flavoring matter may be added as desired. It has been observed that most flavoring and coloring materials produce little or no effect upon the pH of the resulting solution.

The invention also comprises a granulation of crosslinked polymer of acrylic acid with a colloidal gum, such as gelatine, gum acacia, gum tragacanth, pectin or other vegetable, biological and synthetic gums. The granulation is prepared by mixing the crosslinked acrylic acid polymer with the gum diluent in the presence of chloroform and acetone. After thoroughly mixing the materials the chloroform and acetone are driven off by the use of heat in a drying oven. While the gums are the preferred diluents for the granulations, other materials may be used, such as starch, talc, terra alba, etc., to provide body.

The granulations, as described above, may also be used in the preparation of tablets, which is another form of the compositions of the present invention. In addition to the materials contained in the granulation, other inert diluents, such as starch, talc, etc., may be used to provide body. In the preparation of the tableting compositions of the invention it is desirable not to use materials or diluents which prevent tablet disintegration. Any inert, innocuous, nontoxic liquid or solid diluent may be used, which provides the physical properties desired.

Since a daily dosage of about 1 to 5 grams of active ingredient has been found suitable, it is desirable to provide a composition which is easily measured into a unit which will provide about 0.5 to 1 gram of a suitably crosslinked acrylic acid polymer. Thus a 5% aqueous colloidal suspension may be desirable, since a 1-tablespoon dose (approximately 20 grams) will provide 1 gram of the active ingredient. A granulation which contains about 91% of active ingredient should be administered in a dose of 1.1 grams. A tablet containing 72% of the active ingredient may be tableted to contain 0.7 gram of composition, one suitable daily dosage being about 2 tablets. Dry capsules containing 0.5 gram of active ingredient are satisfactory, with 2 capsules per day often being sufficient.

The crosslinked acrylic acid polymers are as initially produced in the form of very finely-divided powders having a high electrostatic charge, the latter property making accurate determination of size distribution of the polymer particles quite difficult to obtain by reason of the tendency of the charged particles to repel each other and to adhere to handling apparatus. This tendency also makes it extremely difficult to use the untreated polymer powder in the formulation of pharmaceutical preparations, such as tablets.

Therefore, the present invention contemplates the use of crosslinked polymers of acrylic acid which have been subjected to the action of steam to agglomerate the crosslinked polymer and to vitiate the effects of the electrostatic charge carried by the polymer in its initial finely-divided form.

For example, a polyacrylic acid resin, crosslinked with allyl sucrose and produced as described hereinabove, was placed in a shallow tray in an enclosed housing and treated with steam at a dry bulb temperature of 210° F. and a wet bulb temperature of 190° F. for about 45 minutes, after which time the wet bulb temperature was reduced to 100° F. and heating was continued at a dry bulb temperature of 200° F. for another 80 minutes.

The polymer subjected to this steaming process is chemically unchanged but is physically agglomerated into a porous cake which is then milled. After milling the polymer is screened and the material having a particle diameter greater than 40 mesh (0.015 inch) is retained for use in the pharmaceutical formulations of this invention. This material has a particle size distribution as shown in the following table:

| Sieve Aperture Width | | Microns | Percent Retained On Sieve |
| --- | --- | --- | --- |
| Mesh No. | Inches | | |
| 10 | 0.0787 | 2,000 | 23 |
| 20 | 0.0331 | 841 | 51 |
| 30 | 0.0232 | 590 | 16 |
| 40 | 0.0165 | 417 | 10 |

In contrast to the relatively large particle size of the steamed and milled polymer, the particle size of the untreated material is from about 10 to about 50 microns. Despite the increased particle size of the treated polymer, its bulk density is much greater than that of the untreated polymer. This is of great advantage in preparing pharmaceutical products for oral administration, for the increase of bulk density results in a decrease of volume for each unit of dosage required. Illustrative of the mentioned change in bulk density of the polymer, an untreated polymer of acrylic acid crosslinked with allyl sucrose was loosely filled into a volume of 1 cc. This volume of polymer weighed 0.210 gram. After steaming and milling in accordance with the process described hereinabove, the polymer had a bulk density of 0.591 gram per cc.

The steamed and milled polymers are easily handled since the electrostatic charge has been removed. Tablets produced from the treated polymer possess a remarkable superiority over those produced from untreated polymer. This superiority is manifested in a firmer tablet, having a greatly reduced tendency to crumble, and in a dramatically reduced disintegration time when the tablets are placed in water.

The present invention also involves a novel process of correcting constipation which comprises administering to the subject a new form of bulk laxative composition which may, for example, be an aqueous colloidal suspension, dry granulation, capsule or tablet. It has been found that a desirable dose of these compositions is one that provides about 0.5 to 1 gram of one of the aforementioned crosslinked polymers of acrylic acid.

In order more clearly to disclose the nature of the present invention, specific examples illustrating the preparation of typical compositions will hereinafter be described. It should be understood, however, that this is done solely by way of example and is intended neither to delineate the scope of the invention nor limit the ambit of the appended claims. Unless otherwise stated, quantities of materials are referred to in terms of parts by weight.

EXAMPLE 1

*5% aqueous colloidal solution of crosslinked polymer of acrylic acid*

| | Percent |
|---|---|
| Water-soluble polymer of acrylic acid crosslinked with 1% of a polyallyl ether of sucrose having an average of about 5.8 allyl groups for each molecule of sucrose (Carbopol–934) (formerly known as "Good-rite K–934") | 5 |
| Potassium dihydrogen phosphate | 2 |
| Dipotassium hydrogen phosphate | 0.5 |
| Soluble saccharin | 0.06 |
| Water | 92.44 |

An aqueous colloidal suspension of the above composition was prepared by incorporating the ingredients listed above in the concentration stated by mixing the solids with the required amount of water. The two phosphoric acid salts are added to produce a more limpid suspension and to adjust the pH. This composition may have, as added ingredients, coloring and flavoring materials to provide the desired physical appearance and taste. This composition has a pH of about 3.3 and has a slightly salty taste, which is not objectionable. It should be noted that the composition contains no sodium and is thus an advantageous way of supplying laxative which will not be objectionable to persons on a sodium-free diet. This dosage form is recommended in dosages of 1 tablespoon (or about 20 grams), which will supply a dose of about 1 gram of the active crosslinked polymer of acrylic acid. This composition provides a fluid preparation of low viscosity which only upon entering the duodenum will expand greatly to provide bulk.

EXAMPLE 2

*Dry granulation of crosslinked polymer of acrylic acid*

| | Percent |
|---|---|
| Water-soluble polymer of acrylic acid crosslinked with 1% of a polyallyl ether of sucrose having an average of about 5.8 allyl groups for each molecule of sucrose (Carbopol–934) (formerly known as "Good-rite K–934") | 91 |
| Gelatine | 9 |

A composition containing the above ingredients in the stated concentration is made by mixing fine gelatine in the amount stated with the required amount of crosslinked acrylic acid polymer. This mixture, after being thoroughly mixed, is triturated with a mixture of chloroform and acetone. The composition is dried and the chloroform and acetone removed by drying in a hot-air drying oven. Other materials may be added when desired, such as the phosphate salts, salting out agents as described in Example 1, which will aid in producing a more limpid suspension when the granular product is dispersed in water before administration. Coloring and flavoring materials may be added to make the product more attractive to the user. A dosage of about 1 gram of crosslinked polymer of acrylic acid may be obtained by dispensing approximately 1.1 grams of granulation. This dosage may be accurately dispensed volumetrically by taking into account the fact that one-half a teaspoonful of crosslinked polymer of acrylic acid, having a particle size of between 20- and 40-mesh size, and without diluent, will weigh approximately 1.1 grams.

EXAMPLE 3

*Tablet formulation*

| | Percent |
|---|---|
| Pectin | 3 |
| Starch | 25 |
| Water-soluble polymer of acrylic acid crosslinked with 1% of a polyallyl ether of sucrose having an average of about 5.8 allyl groups for each molecule of sucrose (Carbopol–934) (formerly known as "Good-rite K–934") | 72 |

A suitable tablet formulation may be prepared by mixing the pectin and crosslinked polymer of acrylic acid in the amounts stated and into this mixture is thoroughly mixed the required amount of dry starch powder. Chloroform and acetone may be used in preparing the granulation in accordance with the customary tablet granulating procedures. After thorough mixing, the granulation is dried to remove the chloroform and acetone, and is then compressed into tablets. In order to supply a tablet providing a dosage of approximately 1 gram of crosslinked polymer of acrylic acid the tablet should contain 1.39 grams of total granulation.

Compositions and tablets in accordance with the present invention may contain other therapeutic ingredients in conjunction with the crosslinked polymers of acrylic acid and they may also contain an effervescent base. Such compositions are described in the following example.

EXAMPLE 4

The following tablet formulation was produced by mixing together the following materials:

| | Grams |
|---|---|
| Aspirin | 5 |
| Sodium carbonate, anhydrous | 6 |
| Citric acid, anhydrous | 20.15 |
| Sodium bicarbonate | 28.85 |
| Water-soluble polymer of acrylic acid crosslinked with 1% of a polyallyl ether of sucrose having an average of about 5.8 allyl groups for each molecule of sucrose (Carbopol–934) which had been steamed and milled in accordance with the process described hereinabove and then granulated | 15 |
| | 75 |

This mixture was then pressed into tablets each of which contained about 0.5 gram of Carbopol–934.

As an example of another suitable unitary dosage form, hard gelatine capsules may each be dry-filled with about 0.5 gram of Carbopol–934 which has been steam-agglomerated in accordance with the hereinabove described process.

The terms and expressions here employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. A pharmaceutical laxative composition for oral administration comprising a colloidally water-soluble polymer of acrylic acid crosslinked with from about 0.75% to 2.0% of a crosslinking agent selected from the class consisting of polyallyl sucrose and polyallyl pentaerythritol said cross-linked acrylic acid polymer having been agglomerated by the action of steam and dried.

2. A pharmaceutical laxative composition for oral administration comprising a colloidally water-soluble polymer of acrylic acid crosslinked with from about 0.75% to 2.0% of a polyhydroxy compound having the hydrogen atoms of at least 3 of the hydroxyl groups replaced by unsaturated aliphatic radicals in unitary dosage form; said cross-linked acrylic acid having been agglomerated by the action of steam and dried.

3. A pharmaceutical laxative composition for oral administration comprising a colloidally water-soluble polymer of acrylic acid crosslinked with from about 0.75% to 2.0% of an unsaturated ether of a polyhydroxy compound having at least 3 ethylenically unsaturated double bonds available for crosslinking purposes in unitary dosage form; said cross-linked acrylic acid polymer having been agglomerated by the action of steam and dried.

4. A pharmaceutical laxative composition in unitary dosage form for oral administration comprising a colloidally water-soluble polymer of acrylic acid and cross-linked with a polyhydroxy compound having the hydrogen atoms of at least 3 of the hydroxyl groups replaced by unsaturated aliphatic radicals; said crosslinked acrylic acid polymer having been agglomerated by the action of steam and dried.

References Cited in the file of this patent

UNITED STATES PATENTS

| | | |
|---|---|---|
| 2,541,142 | Zief | Feb. 13, 1951 |
| 2,798,053 | Brown | July 2, 1947 |

OTHER REFERENCES

Bone: J. Am. Pharm. Assn. (Sci. Ed.), vol. 43, No. 2, February 1954, pp. 102 and 103.

Carbopol 934, March 1954, pp. 1 and 11.

Martin: Am. J. of Digestive Diseases, vol. 21, No. 2, February 1954, pp. 44–45.

U.S. Disp., 24th ed., 1947, Lippincott Co., Phila., Pa, pp. 1061 and 1062.

UNITED STATES PATENT OFFICE
CERTIFICATE OF CORRECTION

October 20, 1959

Patent No. 2,909,462

Robert B. Warfield et al

It is hereby certified that error appears in the printed specification of the above numbered patent requiring correction and that the said Letters Patent should read as corrected below.

Column 2, line 45, for "liquid" read -- limpid fluid --; column 6, line 9, for "1.40 to 25° C." read -- 1.40 at 25° C. --; column 12, line 1, strike out "and"; column 12, line 12, list of references cited, under UNITED STATES PATENTS, for the issue date "July 2, 1947" read -- July 2, 1957 --.

Signed and sealed this 19th day of April 1960.

(SEAL)
Attest:

KARL H. AXLINE
Attesting Officer

ROBERT C. WATSON
Commissioner of Patents